United States Patent
Kitaichi

(10) Patent No.: US 10,516,794 B1
(45) Date of Patent: Dec. 24, 2019

(54) IMAGE READING APPARATUS AND IMAGE FORMING APPARATUS WITH DOCUMENT WIDTH DETECTION

(71) Applicant: FUJI XEROX CO., LTD., Tokyo (JP)

(72) Inventor: Yasuhiro Kitaichi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/264,699

(22) Filed: Feb. 1, 2019

(30) Foreign Application Priority Data

Jul. 6, 2018 (JP) .................................. 2018-128814

(51) Int. Cl.
*H04N 1/00* (2006.01)
*H04N 1/407* (2006.01)
*H04N 1/10* (2006.01)

(52) U.S. Cl.
CPC ....... *H04N 1/0071* (2013.01); *H04N 1/00551* (2013.01); *H04N 1/00567* (2013.01);
(Continued)

(58) Field of Classification Search
CPC ........... H04N 1/00551; H04N 1/00687; H04N 1/00702; H04N 1/00708; H04N 1/0071; H04N 1/00713; H04N 1/00718; H04N 1/00721; H04N 1/00729; H04N 1/00734; H04N 1/00742; H04N 1/00763; H04N 1/00766; H04N 1/00771; H04N 1/00774; H04N 1/00795; H04N 1/00798;
(Continued)

(56) References Cited

U.S. PATENT DOCUMENTS 9,832,332 B2 * 11/2017 Sunako .............. H04N 1/00689
9,888,142 B2 * 2/2018 Kusuhata ........... H04N 1/00684
(Continued)

FOREIGN PATENT DOCUMENTS

JP 2001066711 3/2001

*Primary Examiner* — Scott A Rogers
(74) *Attorney, Agent, or Firm* — JCIPRNET

(57) ABSTRACT

An image reading apparatus includes an image reading unit, a document pressing unit, a first position detection unit, a second position detection unit, and a controller. The image reading unit reads an image of a document. The document pressing unit presses the document against a document placement component. The first position detection unit detects a first closed position at which the document pressing unit is not in contact with the document placement component. The second position detection unit detects a second closed position that is closer to the document placement component than the first closed position is. The controller performs first width detection on the document and further performs second width detection. The first width detection is performed in accordance with detection performed by the first position detection unit on a closing operation of the document pressing unit. The second width detection is performed after elapse of a predetermined time in accordance with detection performed by the second position detection unit on the closing operation of the document pressing unit. If the controller receives an image reading instruction before the elapse of the predetermined time, the controller performs the second width detection without waiting for the elapse of the predetermined time and starts an image reading process.

4 Claims, 11 Drawing Sheets

(52) U.S. Cl.
CPC ..... *H04N 1/00734* (2013.01); *H04N 1/00742* (2013.01); *H04N 1/00811* (2013.01); *H04N 1/1061* (2013.01); *H04N 1/407* (2013.01)

(58) Field of Classification Search
CPC ........... H04N 1/00801; H04N 1/00811; H04N 1/00814; H04N 1/00816; H04N 1/407
See application file for complete search history.

(56) References Cited

U.S. PATENT DOCUMENTS

| | | | |
|---|---|---|---|
| 10,334,131 B2* | 6/2019 | Kii | H04N 1/00708 |
| 2013/0044357 A1* | 2/2013 | Igawa | H04N 1/0071 358/474 |
| 2019/0199874 A1* | 6/2019 | Oka | H04N 1/00708 |

* cited by examiner

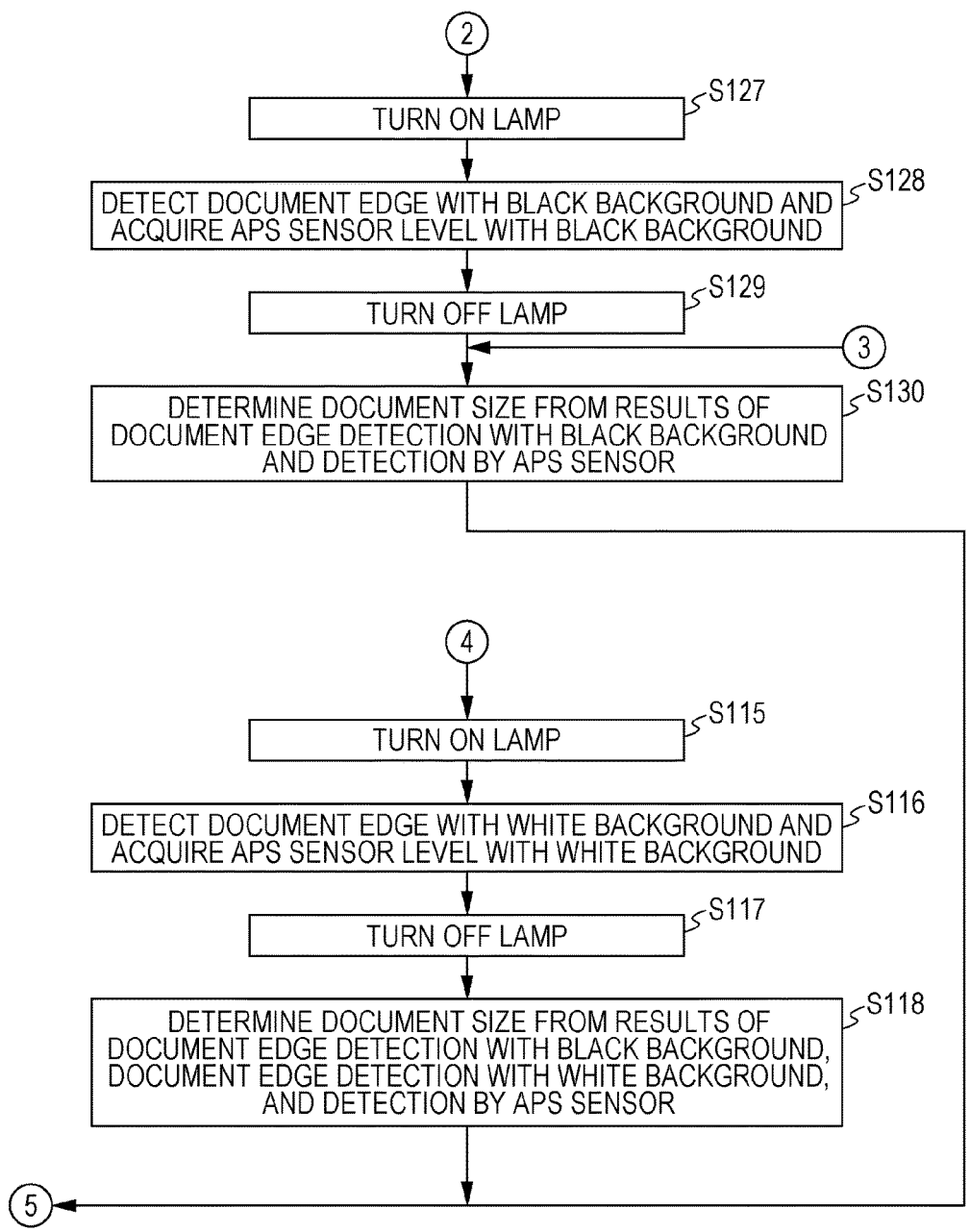

IMAGE READING APPARATUS AND IMAGE FORMING APPARATUS WITH DOCUMENT WIDTH DETECTION

CROSS-REFERENCE TO RELATED APPLICATIONS

This application is based on and claims priority under 35 USC 119 from Japanese Patent Application No. 2018-128814 filed Jul. 6, 2018.

BACKGROUND

(i) Technical Field

The present disclosure relates to an image reading apparatus and an image forming apparatus.

(ii) Related Art

An image reading apparatus including a document pressing unit, a light source unit, an imaging unit, and a width detection unit is known (Japanese Unexamined Patent Application Publication No. 2001-066711). The document pressing unit covers a stationary document reading unit on which a document is placed. The light source unit travels under the stationary document reading unit. The light source unit is used for exposing the document placed on the stationary document reading unit to light in a scanning manner, with the stationary document reading unit placed between the document and the light source unit. The imaging unit reads an image of the document by receiving the light radiated from the light source unit and reflected from the document. The width detection unit detects the width of the document in the main scan direction on the basis of data from the imaging unit. The image reading apparatus includes a closing operation detection unit and a controller. The closing operation detection unit detects a closing operation of the document pressing unit. The controller causes the width detection unit to perform a first width detection operation on the basis of the detection performed by the closing operation detection unit on the closing operation of the document pressing unit. The controller further causes the width detection unit to perform a second width detection operation after the elapse of a predetermined time from the detection of the closing operation.

SUMMARY

Aspects of non-limiting embodiments of the present disclosure relate to an image reading apparatus and an image forming apparatus.

It is an object of the present disclosure to provide an image reading apparatus and an image forming apparatus that enable detection accuracy in second width detection to be enhanced compared with a configuration in which a second width detection operation is performed after the elapse of a predetermined time from the detection of a closing operation by a document pressing unit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image reading apparatus including an image reading unit, a document pressing unit, a first position detection unit, a second position detection unit, and a controller. The image reading unit reads an image of a document. The document pressing unit presses the document against a document placement component. The first position detection unit detects a first closed position at which the document pressing unit is not in contact with the document placement component. The second position detection unit detects a second closed position that is closer to the document placement component than the first closed position is. The controller performs first width detection on the document and further performs second width detection. The first width detection is performed in accordance with detection performed by the first position detection unit on a closing operation of the document pressing unit. The second width detection is performed after elapse of a predetermined time in accordance with detection performed by the second position detection unit on the closing operation of the document pressing unit. If the controller receives an image reading instruction before the elapse of the predetermined time, the controller performs the second width detection without waiting for the elapse of the predetermined time and starts an image reading process.

BRIEF DESCRIPTION OF THE DRAWINGS

An exemplary embodiment of the present disclosure will be described in detail based on the following figures, wherein:

FIGS. 8A, 8B, and 8C are flowcharts illustrating the flow of document size detection operations of the image reading apparatus according to this exemplary embodiment.

DETAILED DESCRIPTION

The disclosure will be described in more detail with reference to the drawings by using an exemplary embodiment and a specific example below. However, the disclosure is not limited to the exemplary embodiment and the specific example.

In the following description using the drawings, it should be noted that the drawings are schematic and the ratio and the like of the dimensions are different from the actual dimensions. Illustration of members other than members needed for the description is appropriately omitted for easy understanding.

First Exemplary Embodiment

1. Configuration of Image Reading Apparatus 1 and Image Forming Apparatus 100

Figure 1:
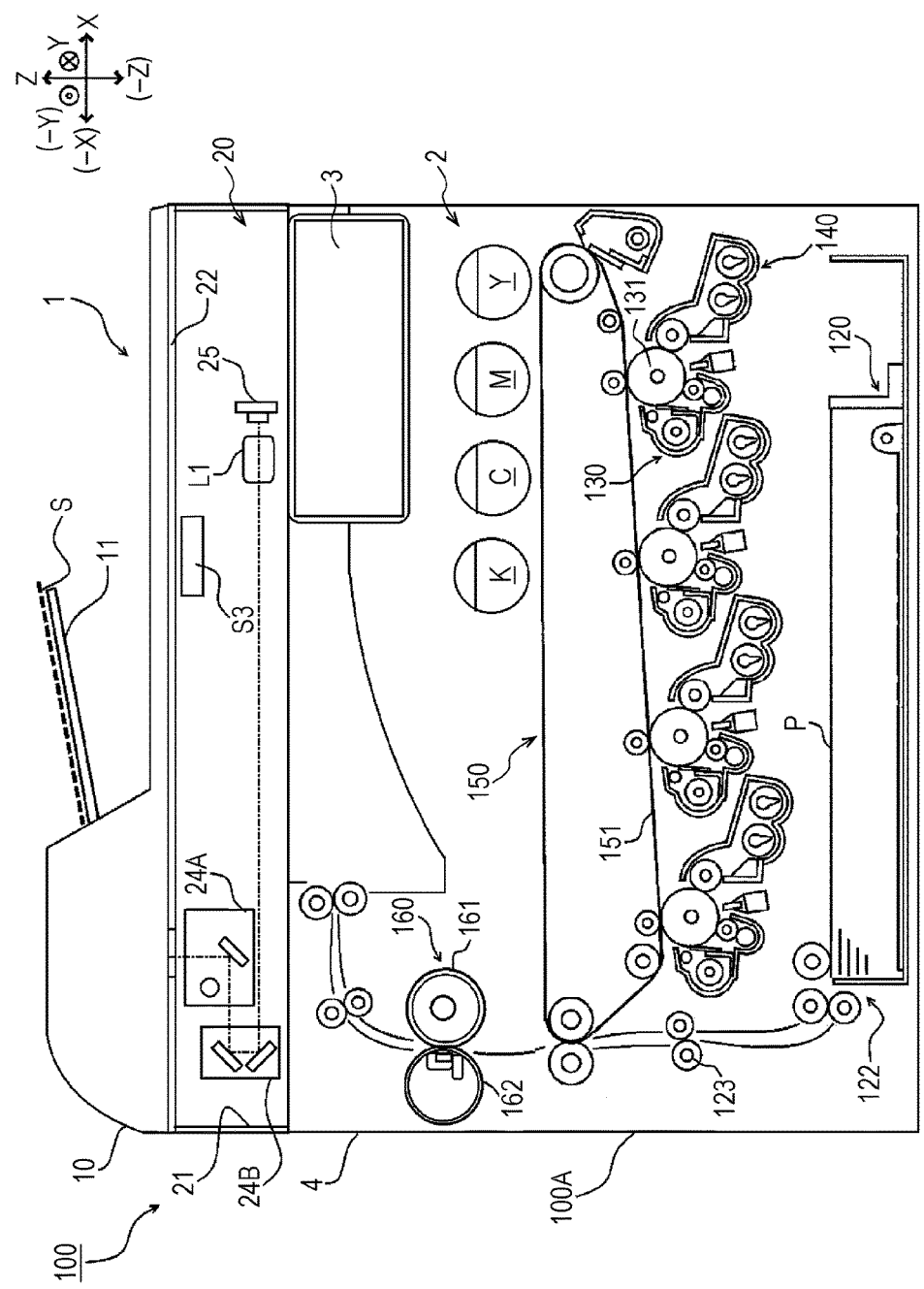
FIG. 1 is a schematic cross-sectional diagram illustrating the internal structure of an image forming apparatus to which an image reading apparatus according to this exemplary embodiment is applied.

FIG. 1 is a schematic cross-sectional diagram illustrating the internal structure of an image forming apparatus 100 to which an image reading apparatus 1 according to this exemplary embodiment is applied.

Hereinafter, the overall configuration and the operations of the image forming apparatus 100 and the image reading apparatus 1 will be described with reference to the drawings.

1.1 Overall Configuration and Operations of Image Forming Apparatus 100

The image forming apparatus 100 includes the image reading apparatus 1 that reads an image from a document S, an image forming unit 2 that prints the read image on a sheet P serving as a recording medium, and an operation information unit 3 serving as a user interface.

The image reading apparatus 1 is supported above a body 100A accommodating the image forming unit 2 by a supporting unit 4 in such a manner that a space for discharging a printed sheet is formed between the image reading apparatus 1 and the body 100A.

1.2 Overall Configuration and Operations of Image Reading Apparatus 1

The image reading apparatus 1 includes an automatic document feeder 10, an image reading unit 20, and a controller device 30. The automatic document feeder 10 transports the document S placed on a document placement tray 11 to the reading position and discharges the read document S to a document discharging unit 12.

The image reading unit 20 includes a platen glass 22 that is disposed on the upper surface of a housing 21 and on which the document S is placed. The image reading unit 20 also includes a full rate carriage 24A, a half rate carriage 24B, an imaging lens L1, an image sensor 25 such as a charge coupled device (CCD) line sensor, and other components each of which is arranged inside the housing 21. The full rate carriage 24A and the half rate carriage 24B may reciprocate in a sub scan direction (right and left directions: an X direction). The imaging lens L1 and the image sensor 25 are disposed below the returning position in the sub scan direction.

When the document S is placed on the platen glass 22, the full rate carriage 24A and the half rate carriage 24B are serially moved in the sub scan direction, and image information is simultaneously read line by line. The image of the entire document S is thereby read while light reflected from the document S is guided to the image sensor 25.

The operation information unit 3 serving as the user interface is arranged on the front side of the image reading apparatus 1. The operation information unit 3 includes a liquid crystal display panel, various operation buttons, a touch panel, and other components that are combined together. A user of the image forming apparatus 100 performs various settings and instruction input by using the operation information unit 3. The liquid crystal display panel is also used to display various pieces of information to the user of the image forming apparatus 100.

1.3 Overall Configuration and Operations of Image Forming Unit 2

The image forming unit 2 includes a feeding device 120, photoconductor units 130, developing devices 140, a transfer device 150, and a fixing device 160 and forms a toner image of the image information on the sheet P fed from the feeding device 120.

The feeding device 120 having a large number of stacked sheets P serving as recording media is disposed at the bottom of the image forming unit 2. Each sheet P positioned widthwise by an alignment guide (not illustrated) is drawn out laterally (in a −X direction) from the top by a sheet drawing part 122 and thereafter is transported to a nip of a registration roller pair 123.

The photoconductor units 130 are disposed parallel to each other above the feeding device 120 (in a Z direction) and respectively include photoconductor drums 131 respectively serving as rotating image holders. Yellow (Y), magenta (M), cyan (C), and black (K) toner images are respectively formed on the photoconductor drums 131 by the respective developing devices 140.

The color toner images respectively formed on the photoconductor drums 131 of the respective photoconductor units 130 undergo electrostatic transfer (first transfer) in order onto an intermediate transfer belt 151 of the transfer device 150, and an overlapped toner image resulting from the overlapping of the respective color toner is formed. The overlapped toner image on the intermediate transfer belt 151 is transferred at a time from the intermediate transfer belt 151 onto the sheet P that is fed from the registration roller pair 123 and that is guided by the transportation guide.

The sheet P having the toner image transferred at a time in the transfer device 150 is transported to the fixing device 160 via the transportation guide, with the toner image having not been fixed yet. By using pressing and heating effects, the toner image is fixed by a fixing roller 161 and a pressure roller 162 that are paired.

The sheet P having the fixed toner image formed thereon is discharged to the space above the image forming unit 2.

2. Configuration of Image Reading Apparatus 1

Figure 2:
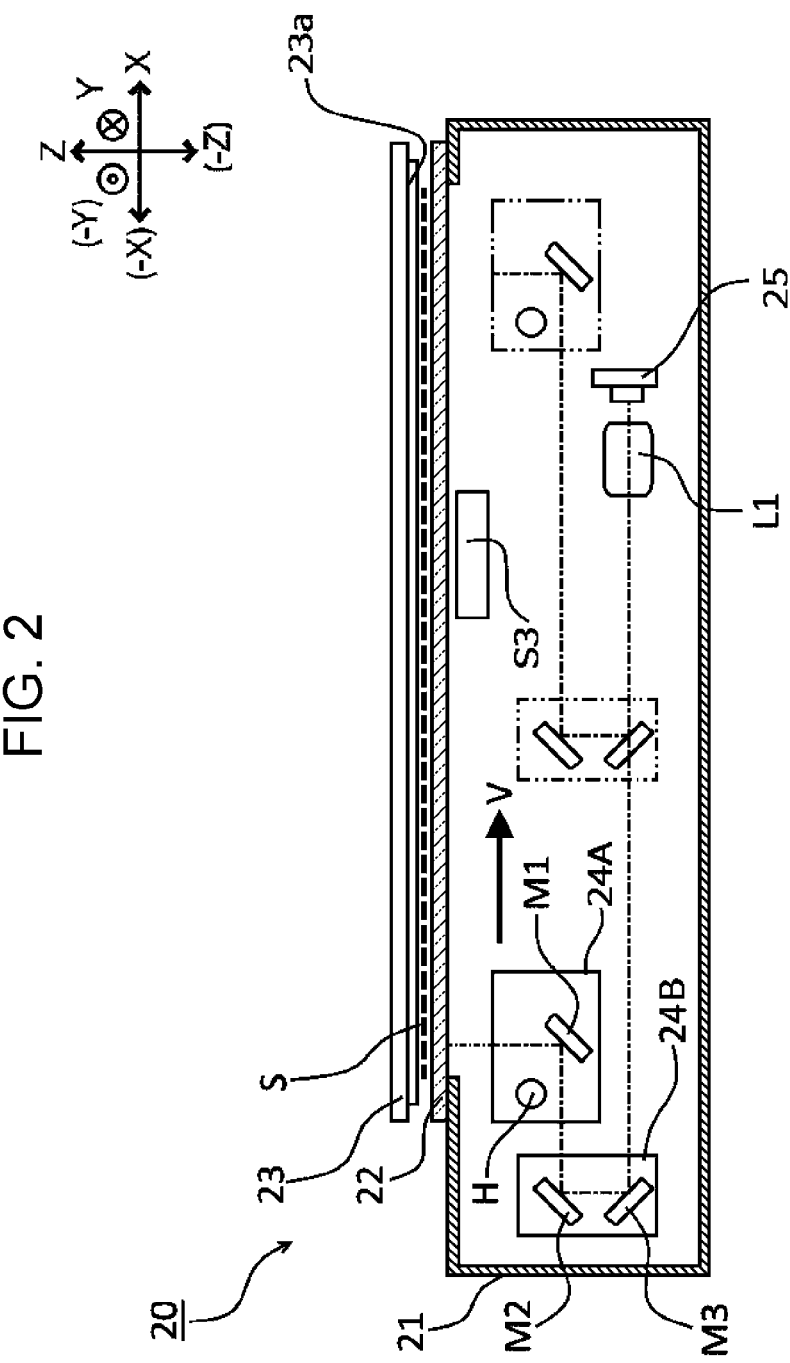
FIG. 2 is a schematic cross-sectional diagram illustrating the internal structure of an image reading unit of the image reading apparatus according to this exemplary embodiment.

FIG. 2 is a schematic cross-sectional diagram illustrating the internal structure of the image reading unit 20 of the image reading apparatus 1.

2.1 Configuration of Image Reading Unit 20

The platen glass 22 is attached to the top of the housing 21 and is designed to place the document S to be read on the platen glass 22 in such a manner that a corner of the document S meets a predetermined corner of the platen glass 22.

A platen covering 23 for document pressing is attached in an openable manner to the housing 21. The platen covering 23 covers the platen glass 22 and is freely opened.

The platen covering 23 is supported on its one end by a hinge or the like, and a document-pressing pad 23a including a white plate or the like is disposed on one surface of the platen covering 23. When the platen covering 23 is closed, the document-pressing pad 23a downwards presses the document S on the platen glass 22.

An angle sensor S1 and a platen sensor S2 are installed near the platen covering 23. The angle sensor S1 detects a state where the platen covering 23 makes a predetermined angle (a state where the platen covering 23 is being closed: half closed). The platen sensor S2 detects a state where the platen covering 23 is closed (fully closed).

The full rate carriage 24A is arranged below the platen glass 22. The full rate carriage 24A holds a first optical system including a lamp H that radiates light onto the document S on the platen glass 22 and a first mirror M1.

The full rate carriage 24A, together with the lamp H and the first mirror M1, is guided by a first rail (not illustrated) and travels in the sub scan direction (X direction) line by line for scanning. The full rate carriage 24A causes the light reflected from the document S to be emitted to a second optical system.

The lamp H radiates the light in a form of a line extending along a main scan direction (Y direction) toward the document S on the platen glass 22. As illustrated by alternate long and short dash lines in FIG. 2, the light reflected from the document S is reflected by the first mirror M1, a second mirror M2, and a third mirror M3 in order. The imaging lens L1 forms an image of the light reflected by the third mirror M3 at a predetermined power on the light receiving surface of the image sensor 25. The image sensor 25 serves as a reading sensor for reading the image of the document S and generates an analog image signal corresponding to the light reflected from the document S.

In addition, an auto paper selector (APS) sensor S3 is installed in the housing 21. The APS sensor S3 detects a standard size, in the sub scan direction (X direction), of the document S on the platen glass 22. Further, the controller device 30 serving as a controller (not illustrated in FIG. 2 and see FIG. 3) is installed in the housing 21 to perform operation control of these components and predetermined signal processing of electric signals acquired by using the image sensor 25 and the APS sensor S3.

Near the full rate carriage 24A, the half rate carriage 24B that holds the second optical system including the second mirror M2 and the third mirror M3 that are paired is arranged. The second mirror M2 and the third mirror M3 are arranged to make a right angle with each other. The second mirror M2 is arranged parallel to the first mirror M1.

The half rate carriage 24B operates together with the full rate carriage 24A and is designed to be able to reciprocate in the sub scan direction while being guided by a second rail (not illustrated). The half rate carriage 24B causes the second mirror M2 to reflect, in the vertical direction (Z direction), the light reflected by the first mirror M1 in the sub scan direction (X direction) and causes the third mirror M3 to reflect the reflected light again in the horizontal direction (X direction).

In the image reading unit 20 having the above-described configuration, the full rate carriage 24A and the half rate carriage 24B are driven by a carriage motor M (not illustrated in FIG. 2 and see FIG. 3) to have a fixed length of an optical path from the reading position for a document image to the image sensor 25. The half rate carriage 24B travels in the same direction as the direction for the full rate carriage 24A. The half rate carriage 24B travels at a travelling velocity V/2 that is half of a travelling velocity V of the full rate carriage 24A. By using alternate long and two short dashes lines, FIG. 2 illustrates the full rate carriage 24A and the half rate carriage 248 at the time when the full rate carriage 24A travels to the returning position in the sub scan direction.

2.2 Functional Configuration of Image Reading Apparatus 1

Figure 3:
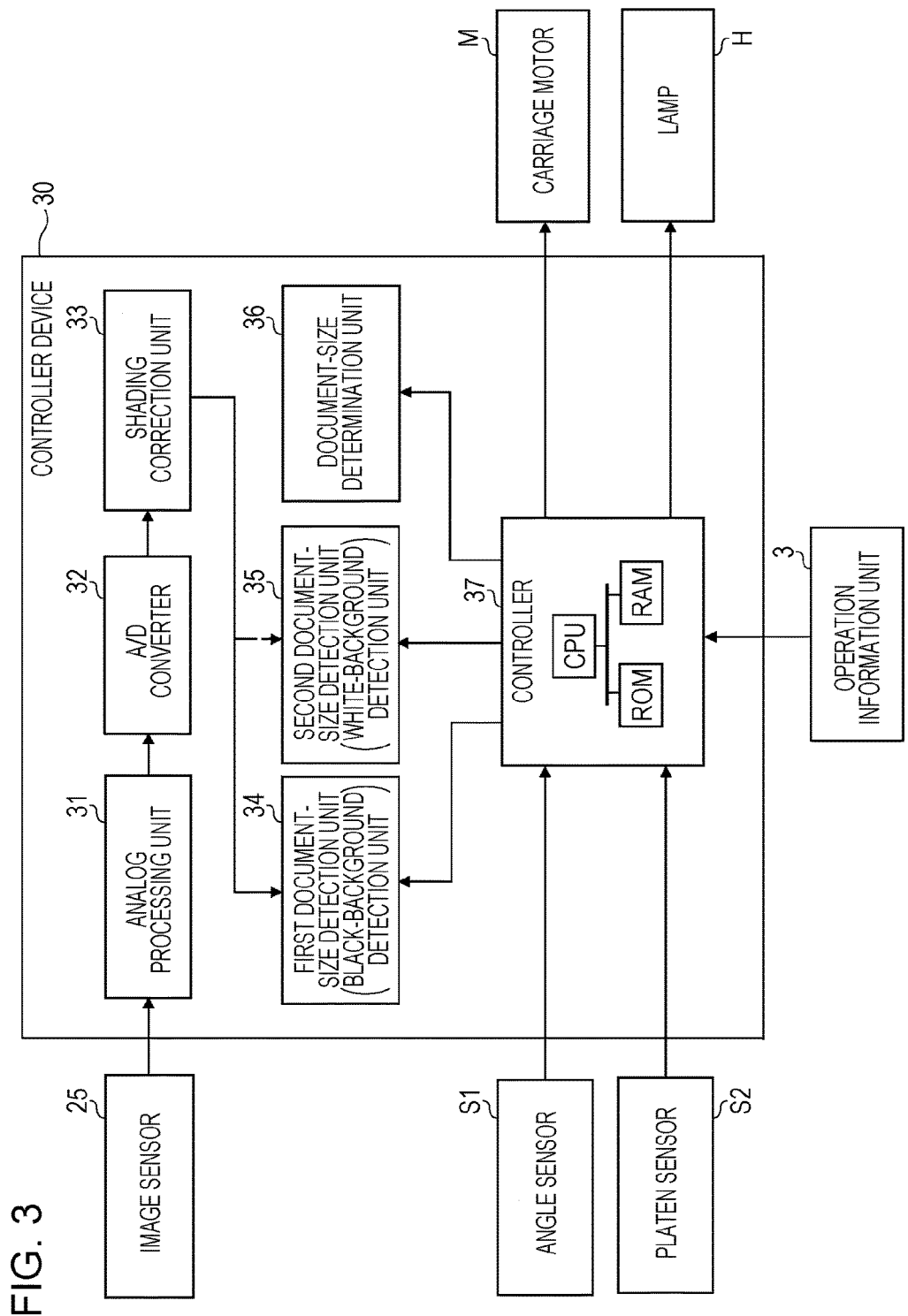
FIG. 3 is a block diagram illustrating an example functional configuration of the image reading apparatus according to this exemplary embodiment.

FIG. 3 is a block diagram illustrating an example functional configuration of the image reading apparatus 1.

The image reading apparatus 1 includes the controller device 30 including an analog processing unit 31, an A/D converter 32, a shading correction unit 33, a first document-size detection unit 34, a second document-size detection unit 35, a document-size determination unit 36, and a controller 37. The analog processing unit 31 performs processing such as sample hold, gain control, or offset control of an electric signal acquired from the image sensor 25. The A/D converter 32 converts the processed analog signal to a digital signal. The shading correction unit 33 performs shading correction on the digital signal. The first document-size detection unit 34 performs first width detection on the document S. The second document-size detection unit 35 performs second width detection. The controller device 30 runs a control program stored in a memory and thereby controls the operations of the image reading apparatus 1.

The first document-size detection unit 34 and the second document-size detection unit 35 detect the document size, in the main scan direction (Y direction), of the document S placed on the platen glass 22 on the basis of the result of the reading by the image sensor 25, that is, the digital signal having undergone the shading correction by the shading correction unit 33. Note that the first document-size detection unit 34 and the second document-size detection unit 35 use mutually different algorithms to perform the document size detection.

The document-size determination unit 36 decides the final document size from results of the detection by the first document-size detection unit 34 and the second document-size detection unit 35.

The controller 37 notifies the first document-size detection unit 34, the second document-size detection unit 35, and the document-size determination unit 36 of the opened/closed states of the platen covering 23 that are detected by the angle sensor S1 and the platen sensor S2, a document size detection start command, and the like. Note that output signals are input into the controller 37 from the angle sensor S1, the platen sensor S2, the APS sensor S3, and the start button (not illustrated) that is used via the operation information unit 3.

2.3 Document Size Detection

Figure 4:
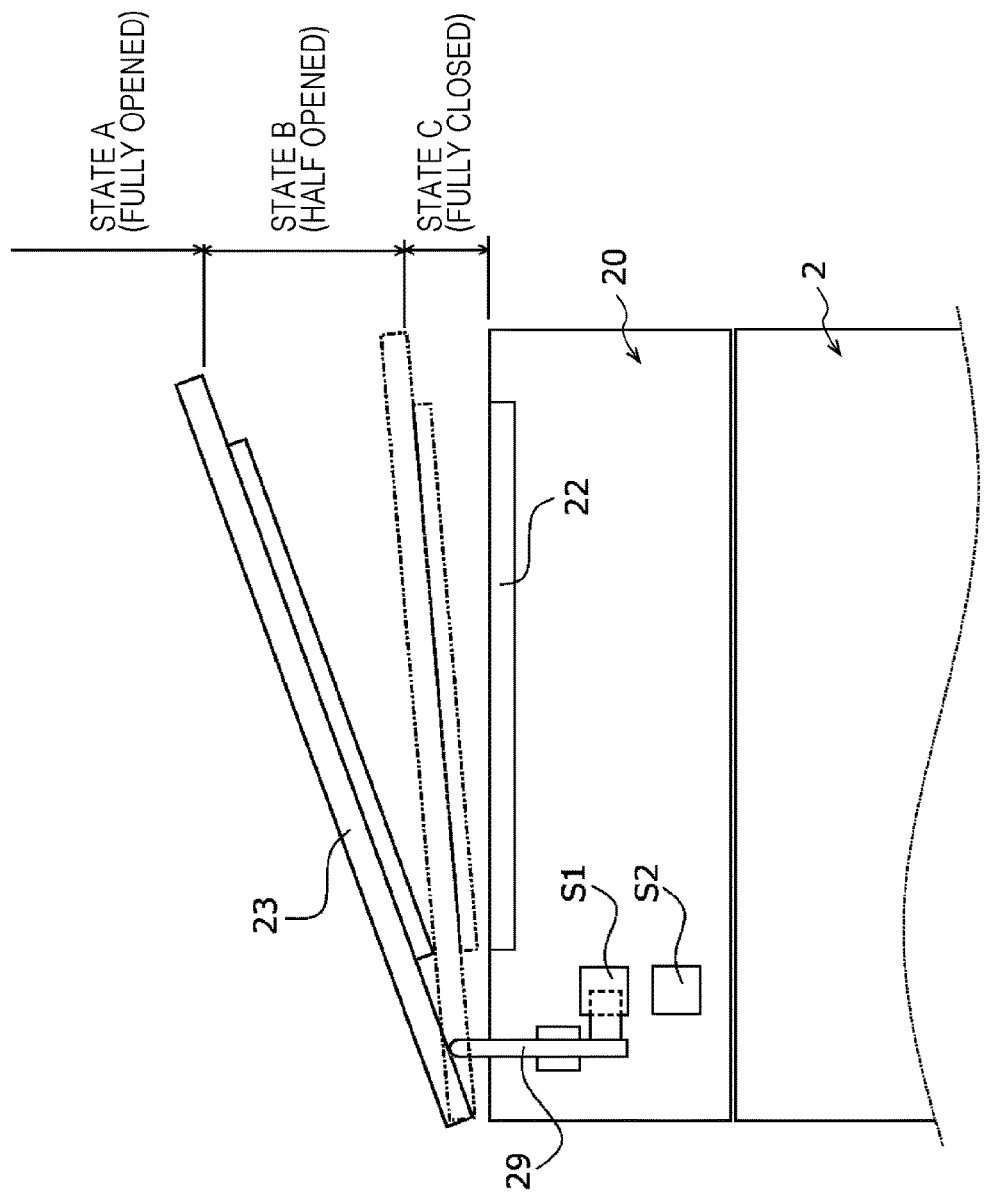
FIG. 4 is a diagram explaining opened/closed positions of a platen covering and detection by an angle sensor and a platen sensor.
Figure 6:
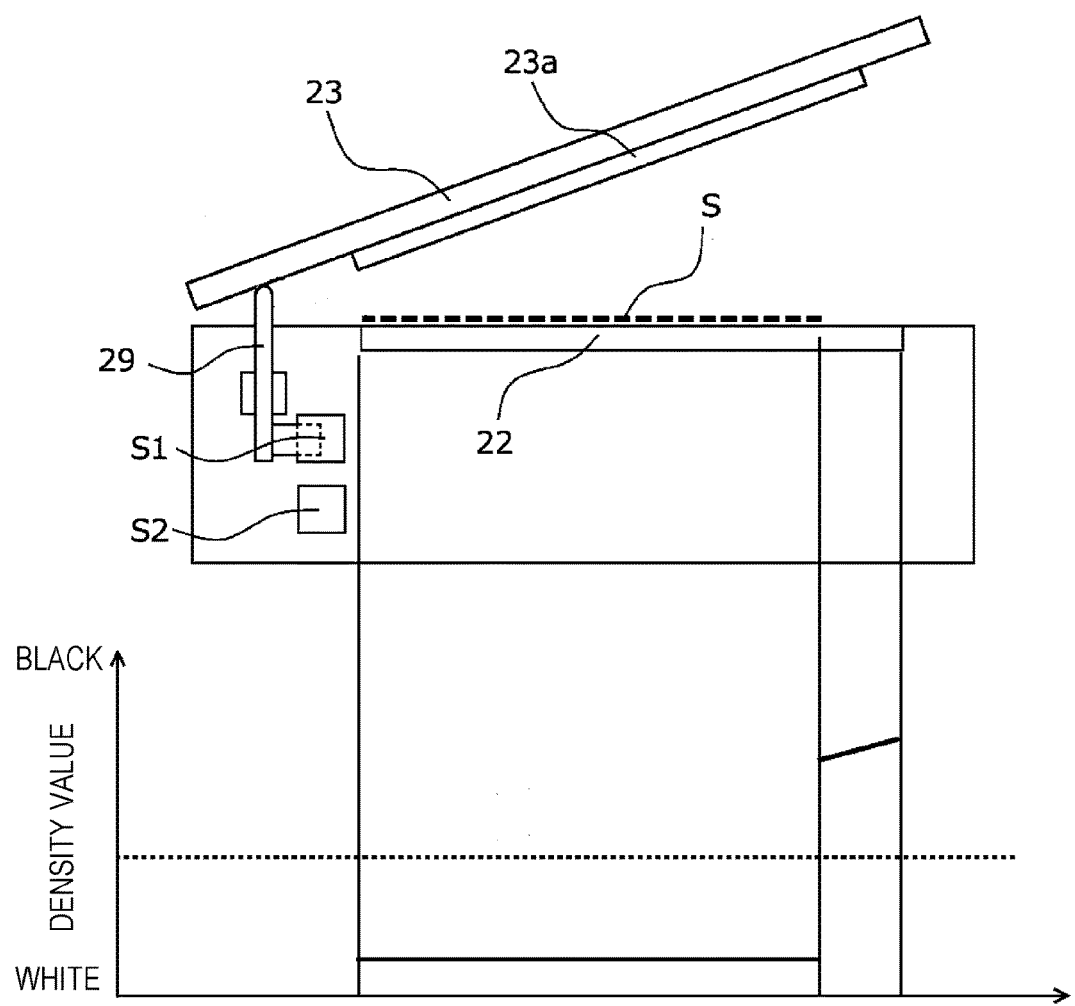
FIG. 6 is an explanatory diagram illustrating an opened/closed position of the platen covering and changes of density values observed when document size detection is performed with a black background.
Figure 7:
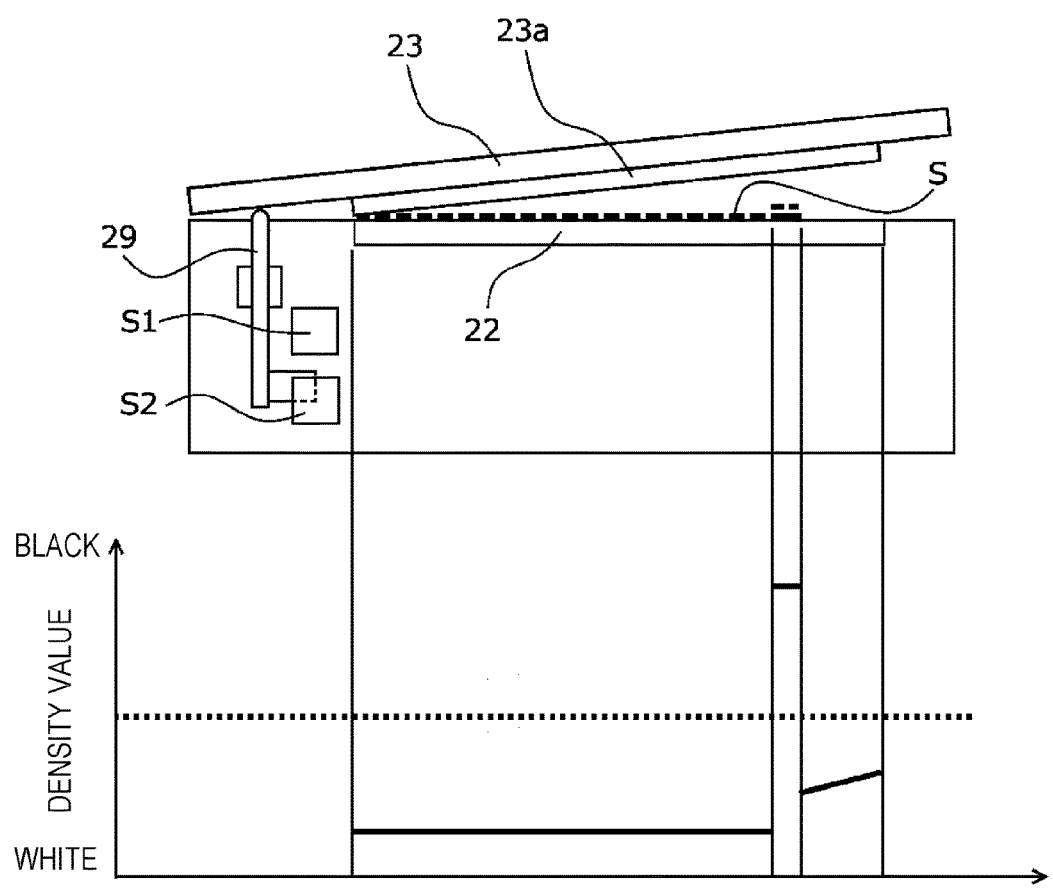
FIG. 7 is an explanatory diagram illustrating an opened/closed position of the platen covering and changes of the density values observed when the document size detection is performed with a white background.

FIG. 4 is a diagram explaining opened/closed positions of the platen covering 23 and detection by the angle sensor S1 and the platen sensor S2. FIGS. 5A to 5D are diagrams and a table explaining states of the detection by the angle sensor S1 and the platen sensor S2. FIG. 6 is an explanatory diagram illustrating an opened/closed position of the platen covering 23 and changes of density values observed when the document size detection is performed with a black background. FIG. 7 is an explanatory diagram illustrating an opened/closed position of the platen covering 23 and changes of the density values observed when the document size detection is performed with a white background.

Hereinafter, the overview of a processing operation performed when the document size of the document S placed on the platen glass 22 is determined in the image reading apparatus 1 will be described.

The angle sensor S1 and the platen sensor S2 each detect the opened/closed state of the platen covering 23. A stick-shaped actuator unit 29 for the angle sensor S1 and the platen sensor S2 is arranged, being urged by a spring member SR to project upwards (in the Z direction) at any time to have a predetermined projection length from the platen glass 22.

Being pressed by the platen covering 23 when the platen covering 23 is closed, the angle sensor S1 and the platen sensor S2 thereby detect the respective opened/closed states of the platen covering 23.

Figure 5:
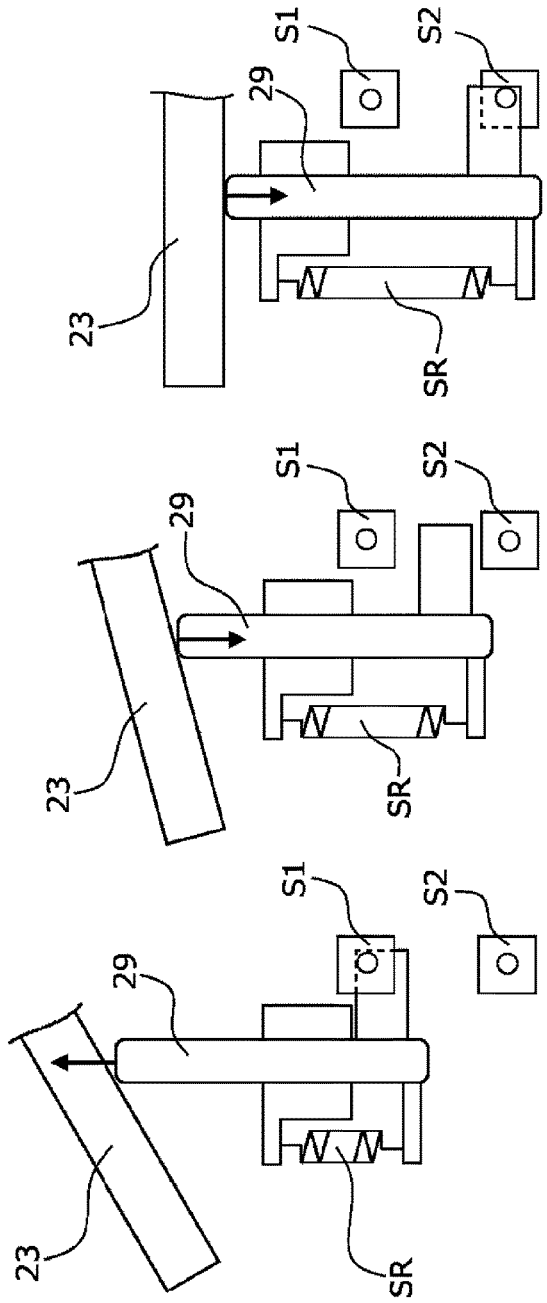
FIGS. 5A, 5B, 5C, and 5D are diagrams and a table explaining states of the detection by the angle sensor and the platen sensor.

Specifically, platen covering opened/closed states detectable by the angle sensor S1 and the platen sensor S2 are the following three states: a state where the platen covering 23 is fully opened (see A: fully opened in FIG. 5A); a state where the platen covering 23 is at a first closed position and is being closed (see B: half opened in FIG. 5B); and a state where the platen covering 23 is at a second closed position and is closed (see C: fully closed in FIG. 5C). An abnormal state (see FIG. 5D) is detectable as needed.

In State A (fully opened) in the image reading apparatus 1, the actuator unit 29 projects to the uppermost position without being pressed by the platen covering 23. The angle sensor S1 is turned on (light blocked), and the platen sensor S2 is turned off (light not blocked).

In State B (half opened), the actuator unit 29 is pressed by the half closed platen covering 23 and is thus being lowered. The angle sensor S1 is turned off (light not blocked), and the platen sensor S2 is turned off (light not blocked) (detection of the first closed position).

In State C (fully closed), the actuator unit 29 is pressed by the platen covering 23 being closed and covering the platen glass 22 and is thus lowered. The angle sensor S1 is turned off (light not blocked), and the platen sensor S2 is turned on (light blocked) (detection of the second closed position). Normally, it is not possible that a state where both of the angle sensor S1 and the platen sensor S2 are turned on (light blocked) occurs, and the state is thus determined as an abnormal state.

As described above, the angle sensor S1 and the platen sensor S2 are disposed on the base and side for the opening or closing of the platen covering 23, and it is possible to detect the opened/closed state of the platen covering 23 with an inexpensive configuration. The detection is triggered by the combination of the light blocked state and the not blocked light state based on the actuator unit 29 that is used for both the angle sensor S1 and the platen sensor S2 and that moves in accordance with an operation for opening or closing the platen covering 23.

As illustrated in FIG. 6, when the platen covering 23 is in the half closed state (see B in FIG. 6) changed from the fully opened state (see A in FIG. 6) and thus is at the first closed position, the first document-size detection unit 34 causes the lamp H to be turned on and the image sensor 25 to detect reflected light.

As illustrated in FIG. 6, a part corresponding to the document S in the detected image takes on a low density value (white: the color of the document) because the light is reflected from the document S. The other part not corresponding to the document S takes on high density values (black: the black background) because the part is open and the light is not reflected. The APS sensor S3 is also operated almost simultaneously to detect the width (length), in the sub scan direction, of the document S. Document edge detection with the black background serving as the first width detection is thereby performed.

The platen covering 23 is further closed, and the platen covering 23 is in the fully closed state (see B in FIG. 6) changed from the half closed state (see B in FIG. 6) and thus is at the second closed position. After the elapse of a predetermined time in this state, the lamp H is turned on for black detection (with the white background). The black detection is set to be started after the platen covering 23 is completely closed, for example, about two seconds after the detection of State C (fully closed). Note that the time is not limited to this time.

The platen covering 23 is formed to have a white back surface having the same color as that of a typical document S and thus has the color similar to that of the document S as a whole. If the document S is edged in black or the like, the second document-size detection unit 35 detects the black part with high density values as illustrated in FIG. 6. If the document S is a color document, an area corresponding to the document S is detected with high density values. The document edge detection with the white background as the second width detection is thereby performed.

Even if the document S is edged or is a color document, the document-size determination unit 36 may accurately detect the width of the document S in the main scan direction by combining the document edge detection with the black background performed by the first document-size detection unit 34 and the document edge detection with the white background performed by the second document-size detection unit 35.

2.4 Document Size Detection Operation

Figure 8A:
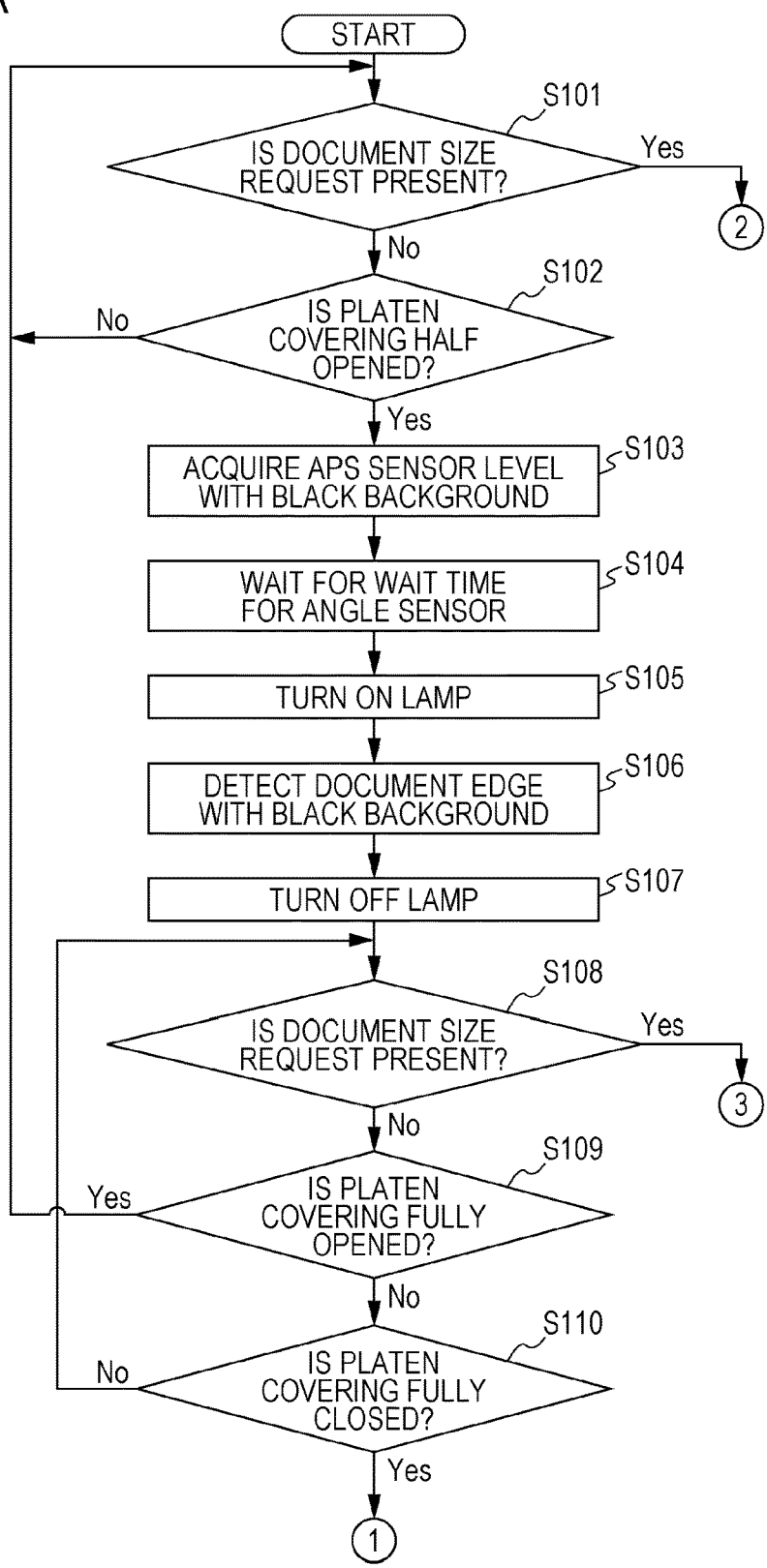
Figure 8B:
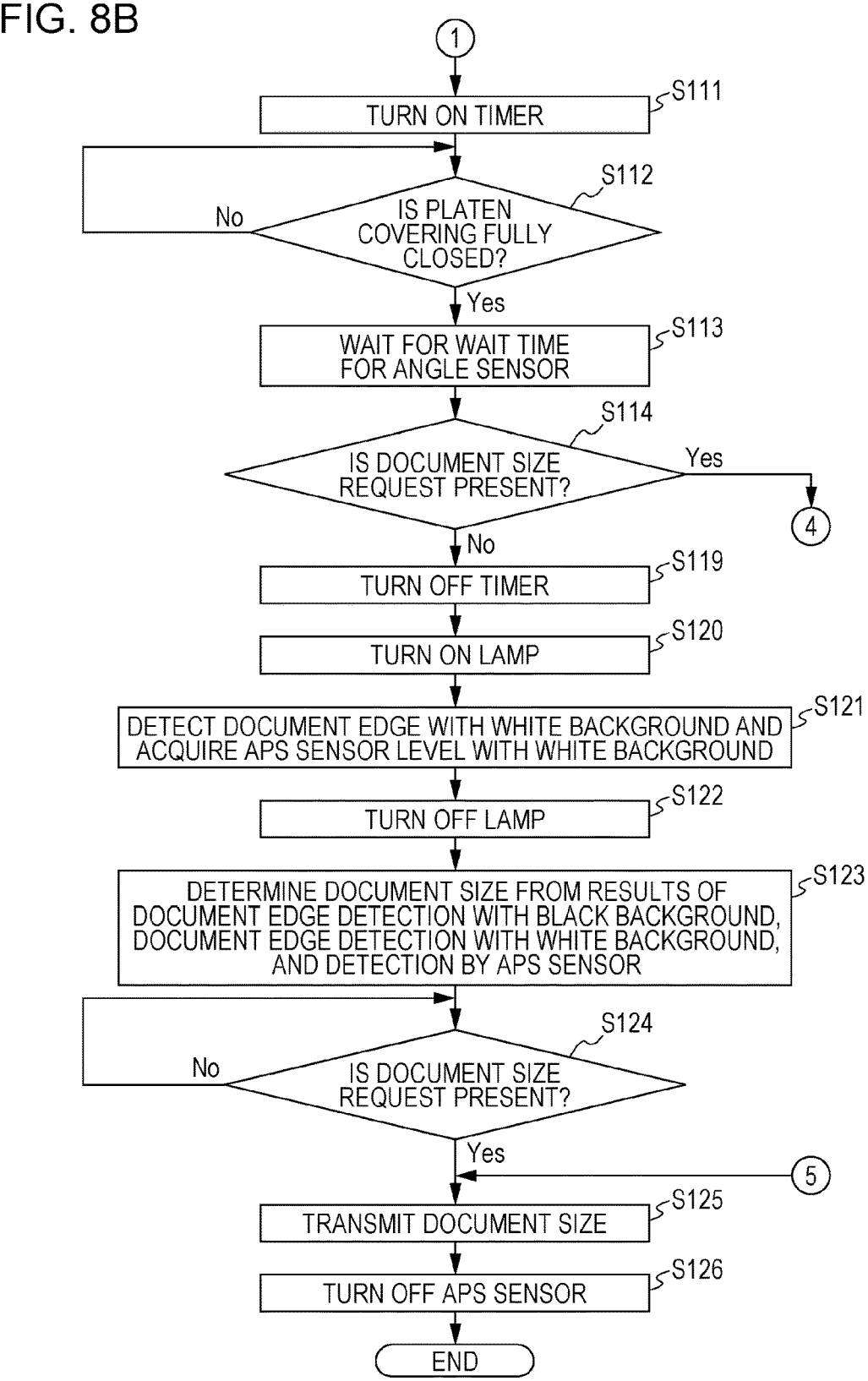
Figure 9:
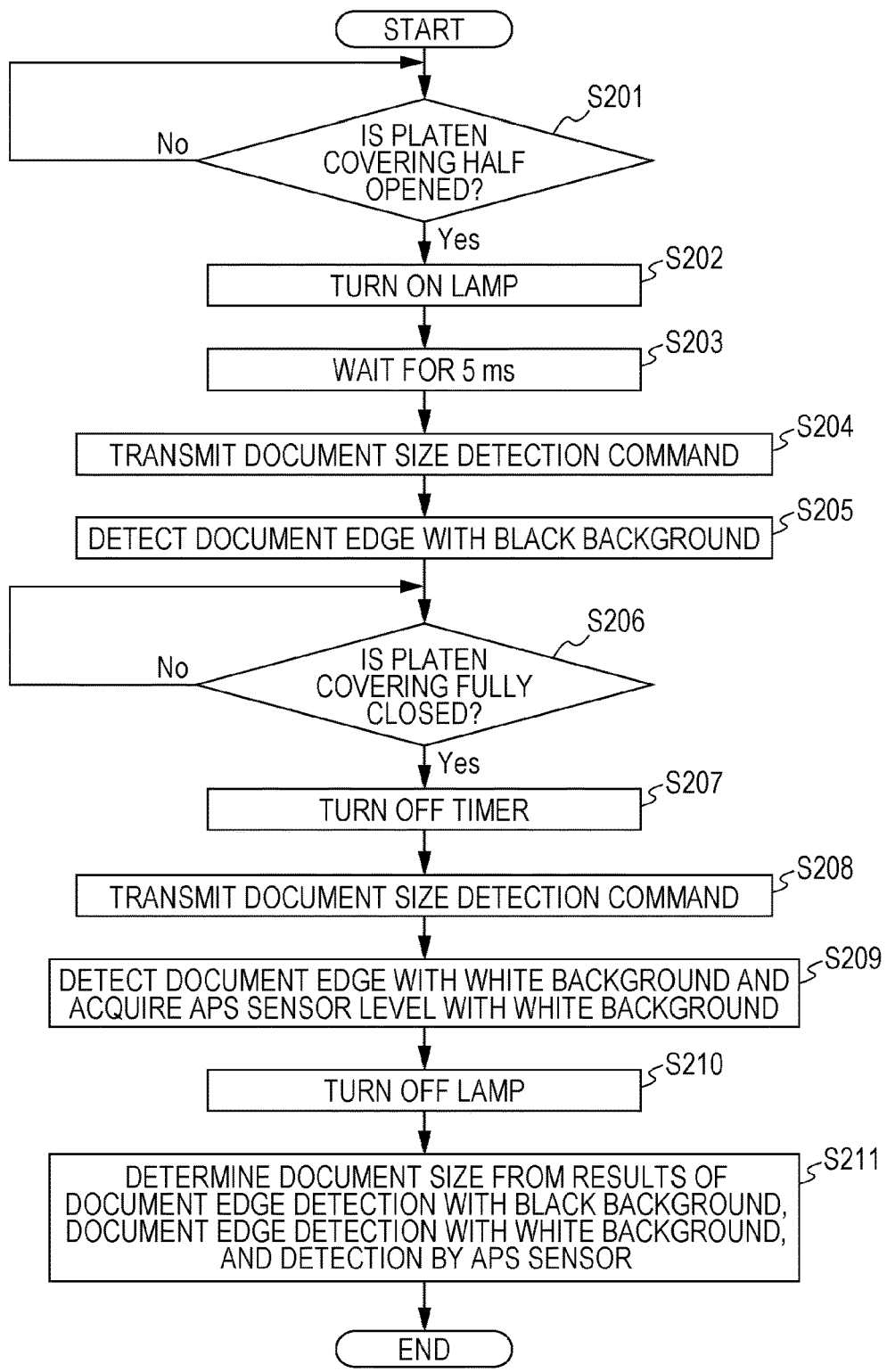
FIG. 9 is a flowchart illustrating the flow of document size detection operations in a comparative example.

FIGS. 8A to 8C are flowcharts illustrating the flow of a document size detection operation of the image reading apparatus 1 according to this exemplary embodiment. FIG. 9 is a flowchart illustrating the flow of a document size detection operation of an image reading apparatus 200 in a comparative example in which second width detection is performed a predetermined time after the detection of the second closed position.

Hereinafter, the document size detection operation of the image reading apparatus 1 will be described with reference to the flowchart.

When the state of the platen covering 23 in the image reading apparatus 200 in the comparative example becomes State B (half opened: a first closed position) from State A (fully opened), the angle sensor S1 is turned off (light not blocked) from the on state (light blocked) (S201: Yes). Accordingly, the controller 37 turns on the lamp H in response to this (S202) and waits for 5 ms from the start of the lighting to wait until the light radiation amount of the lamp H becomes stable (S203).

After the elapse of 5 ms from the start of the lighting of the lamp H, the controller 37 transmits a document-size detection command to the first document-size detection unit 34 (S204). In response to this, the first document-size detection unit 34 performs document size detection in the main scan direction in the half opened state (State B) (document edge detection with the black background) of the platen covering 23 (S205).

When the platen covering 23 is thereafter closed (at the second closed position), the angle sensor S1 is turned off (light not blocked), and the platen sensor S2 is turned on (light blocked) (S206: Yes). Accordingly, the controller 37 waits until the predetermined time elapses (S207) and transmits a document-size detection command to the second document-size detection unit 35 (S208).

In response to this, the second document-size detection unit 35 performs document size detection in the main scan direction in the closed state (State C) (document edge detection with the white background) of the platen covering 23 and simultaneously acquires the sensor level of the APS sensor S3 with the white background (S209). The controller thereafter turns off the lamp H (S210).

After the first document-size detection unit 34 and the second document-size detection unit 35 respectively perform the document edge detection of the half closed state (State B) and the fully closed state (State C) of the platen covering 23, the document-size determination unit 36 determines the final document size from the detection results and decides the determination result as the size of the document S on the platen glass 22 (S211).

As described above, the second document-size detection unit 35 performs the document edge detection with the white background after the elapse of the predetermined time from the detection of the second closed position. The document size detection is thereby performed with the platen covering 23 certainly in the closed state even if the second closed position is detected in a state where the platen covering 23 is, for example, in a slightly opened state where the degree of openness is slightly larger than that of the closed state.

In contrast, if a reading instruction is received before the elapse of the predetermined time, the second document-size detection unit 35 does not perform the document size detection (document edge detection with the white background), and thus the document size detection is likely to be performed inaccurately.

In the image reading apparatus 1 according to this exemplary embodiment, if a reading instruction is received before the elapse of the predetermined time from the detection of the second closed position, the second document-size detection unit 35 performs the document edge detection with the white background, and the document-size determination unit 36 determines the document size on the basis of the document edge detection with the black background by the first document-size detection unit 34 and the document edge detection with the white background by the second document-size detection unit 35. Thereafter, the image reading apparatus 1 starts an image reading process.

If a document size request made by inputting, by using the operation information unit 3, a signal output from the start button (not illustrated) for copying or scanning is not present when the platen covering 23 is in State A (fully opened) (S101: No), the controller 37 determines whether the state of the platen covering 23 becomes State B (half opened) from State A (fully opened) (S102). Specifically, the controller 37 determines whether the angle sensor S1 is turned off (light not blocked), whether the platen sensor S2 is turned off (light not blocked), and whether the first closed position is thus detected.

If the first closed position is detected (S102: Yes), the sensor level of the APS sensor S3 with the black background is acquired (S103). The width (length) of the document S in the sub scan direction is thereby detected. After the elapse of a predetermined wait time in response to the detection by the angle sensor S1 (up to 150 ms) (S104), the controller 37 turns on the lamp H (S105). The first document-size detection unit 34 detects a document edge with the black background (S106). Thereafter, the controller 37 turns off the lamp H (S107).

The controller 37 again determines whether the document size request is present (S108). If the document size request is not present (S108: No), the controller 37 determines whether the platen covering 23 is in State A (fully opened) (S109). In other words, whenever the platen covering 23 is in State B (half opened), the controller 37 checks whether the platen covering 23 is not in State A (fully opened).

If the platen covering 23 is not in State A (fully opened) (S109: No), the controller 37 determines whether the state of the platen covering 23 becomes State C (fully closed) (S110). If the platen covering 23 is in State C (fully closed) (S110: Yes), the controller 37 turns on a timer to cause the second document-size detection unit 35 to perform the document edge detection with the white background after the elapse of the predetermined time (S111). The controller 37 determines whether the platen covering 23 is in State C (fully closed) (S112). The determination of the fully closed state is performed, for example, every 10 ms to determine whether the platen covering 23 is in State C (fully closed) (S112).

If the platen covering 23 is in State C (fully closed) (S112: Yes), waiting is performed (for up to 150 ms) in response to the detection by the angle sensor S1 (S113). After the elapse of the wait time, the controller 37 determines whether the document size request is present (S114). If the document size request is present (S114: Yes), that is, if the reading instruction is received before the elapse of the predetermined time, the controller 37 turns on the lamp H to detect the document edge with the white background (S115). At this time, the controller 37 waits, for example, for 25 ms from the start of the lighting to wait until the light radiation amount of the lamp H becomes stable.

After the elapse of 25 ms from the lighting of the lamp H, the controller 37 transmits the document-size detection command to the second document-size detection unit 35. The controller 37 detects the document edge with the white background and simultaneously acquires the sensor level of the APS sensor S3 with the white background (S116). Thereafter, the controller 37 turns off the lamp H (S117).

The document-size determination unit 36 determines the final document size on the basis of the results of the document edge detection with the black background, the document edge detection with the white background, and the detection by the APS sensor S3 and decides the determination result as the size of the document S on the platen glass 22 (S118).

The document-size determination unit 36 transmits the determined document size information to the controller 37 (S125), and the APS sensor S3 is turned off (S126).

If the document size request is not present in step S114 (S114: No), that is, if the reading instruction is not present before the elapse of the predetermined time, the waiting is continued until the wait time expires to ordinarily detect the document edge with the white background (S119), and the lamp H is then turned on (S120). At this time, the controller 37 waits, for example, for 25 ms from the start of the lighting to wait until the light radiation amount of the lamp H becomes stable.

After the elapse of 25 ms from the lighting of the lamp H, the controller 37 transmits the document-size detection command to the second document-size detection unit 35. The controller 37 detects the document edge with the white background and simultaneously acquires the sensor level of the APS sensor S3 with the white background (S121). Thereafter, the controller 37 turns off the lamp H (S122).

The document-size determination unit 36 determines the final document size on the basis of the results of the document edge detection with the black background, the document edge detection with the white background, and the detection by the APS sensor S3 and decides the determination result as the size of the document S on the platen glass 22 (S123).

The document-size determination unit 36 further determines whether the document size request is present (S124). If the document size request is present (S124: Yes), the document-size determination unit 36 transmits the determined document size information to the controller 37 (S125), and the APS sensor S3 is turned off (S126).

If the document size request is present when the platen covering 23 is in State A (fully opened) in step S101 (S101: Yes), the controller 37 turns on the lamp H to detect the document edge with the black background (S127). The controller 37 detects the document edge with the black background and simultaneously acquires the sensor level of the APS sensor S3 with the black background (S128). Thereafter, the controller 37 turns off the lamp H (S129).

The document-size determination unit 36 determines the document size on the basis of the results of the document edge detection with the black background and the detection by the APS sensor 26 and decides the determination result as the size of the document S on the platen glass 22 (S130).

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading apparatus comprising:
an image sensor that reads an image of a document;
a platen covering that presses the document against a document placement component;
a first position detection sensor that detects a first closed position at which the platen covering is not in contact with the document placement component;
a second position detection sensor that detects a second closed position that is closer to the document placement component than the first closed position is; and
a controller that performs first width detection on the document and further performs second width detection, the first width detection being performed in accordance with detection performed by the first position detection sensor on a closing operation of the platen covering, the second width detection being performed after elapse of a predetermined time in accordance with detection performed by the second position detection sensor on the closing operation of the platen covering,
wherein if the controller receives an image reading instruction before the elapse of the predetermined time, the controller performs the second width detection without waiting for the elapse of the predetermined time and starts an image reading process.

2. The image reading apparatus according to claim 1,
wherein the first position detection sensor and the second position detection sensor are disposed on a base point side for the closing operation of the platen covering.

3. An image forming apparatus comprising:
the image reading apparatus according to claim 1, the image reading apparatus reading an image of a document; and
an printer that prints the image read by the image reading apparatus on a recording medium.

4. An image reading apparatus comprising:
image reading means for reading an image of a document;
document pressing means for pressing the document against a document placement component;
first detection means for detecting a first closed position at which the document pressing means is not in contact with the document placement component;
second detection means for detecting a second closed position that is closer to the document placement component than the first closed position is; and
control means for performing first width detection on the document and further performing second width detection, the first width detection being performed in accordance with detection performed by the first detection means on a closing operation of the document pressing means, the second width detection being performed after elapse of a predetermined time in accordance with detection performed by the second detection means on the closing operation of the document pressing means,
wherein if the control means receives an image reading instruction before the elapse of the predetermined time, the control means performs the second width detection without waiting for the elapse of the predetermined time and starts an image reading process.

* * * * *